UNITED STATES PATENT OFFICE.

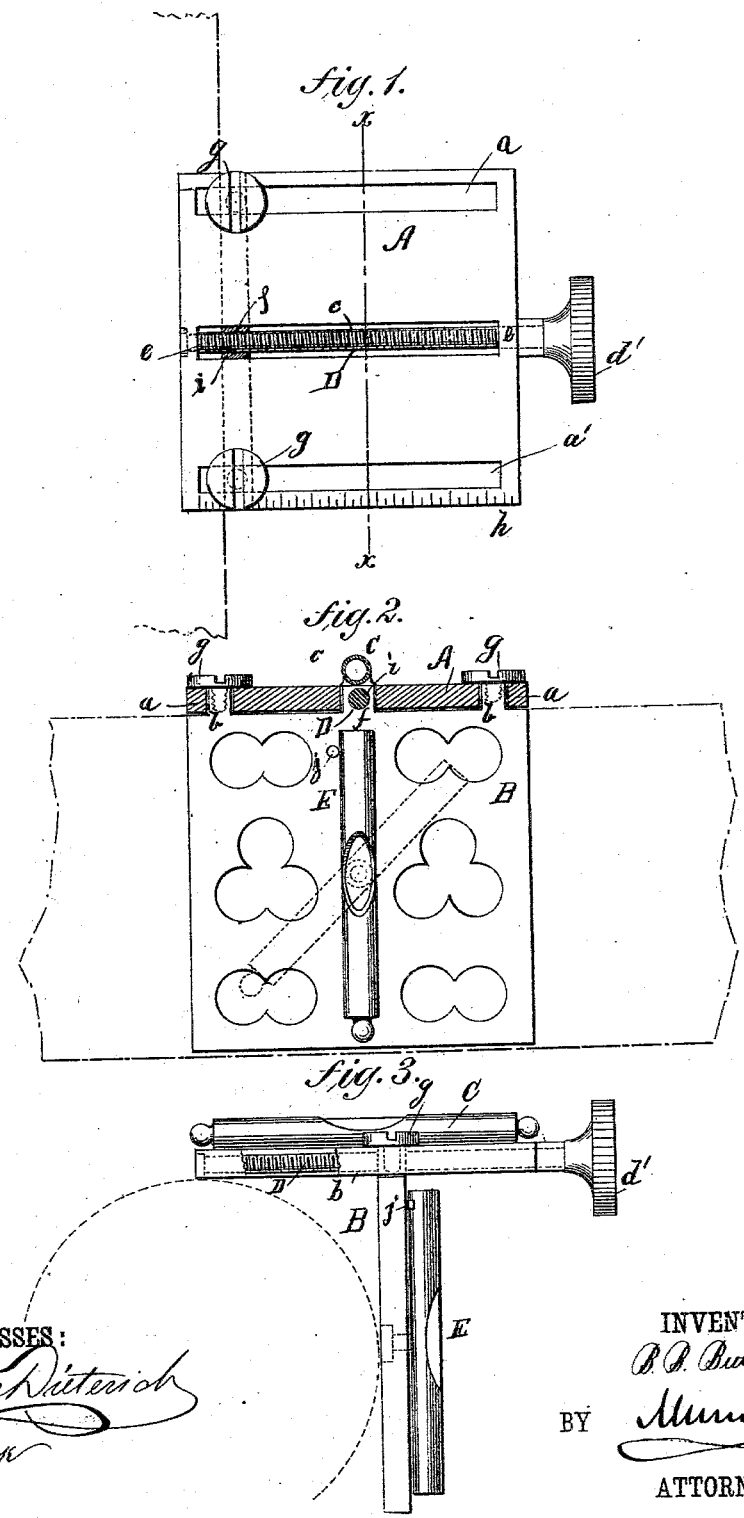

BOZWELL B. BUTT, OF RICHMOND, VIRGINIA.

RIGHT-ANGLED LEVEL.

SPECIFICATION forming part of Letters Patent No. 283,564, dated August 21, 1883.

Application filed December 7, 1882. (No model.)

*To all whom it may concern:*

Be it known that I, BOZWELL B. BUTT, of Richmond, in county of Henrico and State of Virginia, have invented a new and useful Right-Angled Level, of which the following is a full, clear, and exact description.

Reference is to be had to the accompanying drawings, forming a part of this specification, in which similar letters of reference indicate corresponding parts in all the figures.

Figure 1 is a front elevation of my improved right-angled level, showing the face of the slotted, graduated, and screw-carrying plate. Fig. 2 is a sectional side elevation of the level, taken on the line $x$ $x$ of Fig 1; and Fig. 3 is a plan view of the level, showing the top edges of the plates, a portion of the main graduated plate being broken away to show clearly the position of the adjusting-screw.

The main plate A is formed with the slots $a$ $a'$ near its edges, and with the central slot, $c$, and is provided with the spirit-level C, which, by preference, is secured to the plate over the central slot, $c$, by soldering the level at its ends to the narrow portions $e$ $e$ of the plate left at the ends of the said central slot. These narrow portions $e$ $e$ of the plate A are perforated through from the edges of the plate to the ends of the central slot, $c$, and the adjusting-screw D is journaled in these perforations, as clearly shown in Fig. 1. The plate B is of the same width as the plate A, and is cut away upon one of its edges to form the side studs, $b$ $b$, and the central stud, $d$, which studs fit in the slots $a$, $a'$, and $c$ of the plate A, as shown in Fig. 2; and this plate is provided upon one of its side with the pivoted spirit-level E. The studs $b$ $b$ are tapped in from the ends of the studs to receive the screws $g$ $g$, and the stud $f$ is tapped through from the side or formed with the screw-threaded orifice $i$ for the passage of the adjusting-screw D. By this means it will be seen that the plate B is secured, by means of the screws $g$ $g$ and the screw-rod D, to the plate A, so as to stand at right angles thereto, as shown in Fig. 3; and by means of the screw D and the thumb-nut $d'$, secured to one end thereof, it will be seen that the plates A and B are adjustable upon each other—that is, the plate B is adapted to be moved along in the slots of the plate A by turning the screw D, and that the plates will always maintain their proper right-angled relation to each other. The plate B is formed or provided with the stop $j$, which is so arranged relative to the pivot of the level E that when the level E is turned against it, as shown in Figs. 2 and 3, the level E will be exactly at right angles to the level C. The narrow strip $h$, at one edge of the plate A, formed by making the slot $a'$, is graduated, as shown in Fig. 1, for setting the plate B at any prescribed distance from the outer edge of the plate A to adapt it to material of any thickness upon which it is desired to use the implement. This right-angled level is especially adapted to the use of builders, machinists, and others, and is useful for plumbing timbers two ways at once, by applying it to the corner of a timber. When both level-bulbs lie in the same plane, and when the bubbles are central in both bulbs, the timber to which the instrument is applied is plumb on two sides.

When it is desired to use the instrument as an inclinometer, the movable level-bulb E is placed at an angle with the horizontal, corresponding with angle that the plate A is to form with the vertical. The plate A is then placed against the side of the inclined object, and the latter may be moved until the bubble in the bulb E assumes a central position, when the object will have the required inclination. The object thus inclined may be adjusted in a vertical plane by means of the level-bulb C'. My improved angle-level is capable of other useful applications.

Having thus described my invention, I claim as new and desire to secure by Letters Patent—

1. The plate A, having the central slot, $c$, and narrow perforated portions $e$ $e$, in combination with the spirit-level C, end-soldered to said portions $e$, and the adjusting-screw D in the perforations of said portions $e$, as shown and described.

2. The plate A, formed with the side slots, $a$ $a'$, and the central slot, $c$, and provided with the level C and adjusting-screw D, in combination with the plate B, provided with the swiveled level E, the plate B being adapted to be adjusted along the plate A by the screw D, substantially as described.

3. The adjustable right-angled plates A and

B, provided with the levels C and E, the plate A being graduated, as shown at $h$, substantially as described.

4. The plate A, having slots $a\ c\ a'$, and the plate B, cut away at one of its edges to form the side studs, $b\ b$, and central stud, $d$, fitting in said slots, in combination with the screws $g\ g$, working in threads of the studs $b$, the adjusting-screw D, working in threaded orifice $i$ of the stud $f$, and the thumb-nut $d'$, whereby the local relation of the plates may be varied, as described.

BOZWELL B. BUTT.

Witnesses:
   HOLLAND BUTT,
   CHARLES M. JONES.